INTEGRATED SEMICONDUCTOR RECTIFIER ASSEMBLY

Filed May 3, 1963 3 Sheets-Sheet 1

WITNESSES
Theodore T. Wrobel
Donald R. Lackey

INVENTORS
Ronald C. Whigham
and Frank V. Marcinko
BY
F. E. Browder
ATTORNEY

INTEGRATED SEMICONDUCTOR RECTIFIER ASSEMBLY

Filed May 3, 1963 3 Sheets-Sheet 3

3,356,914
Patented Dec. 5, 1967

3,356,914

INTEGRATED SEMICONDUCTOR RECTIFIER ASSEMBLY

Ronald C. Whigham, Greensburg, and Frank V. Marcinko, South Union Township, Fayette County, Pa., assignors to Westinghouse Electric Corporation, Pittsburgh, Pa., a corporation of Pennsylvania Filed May 3, 1963, Ser. No. 277,949
1 Claim. (Cl. 317—234)

This invention relates in general to rectifier apparatus and more particularly to rectifier bridge assemblies.

The present practice of most manufacturers who utilize rectifier bridge assemblies, such as the automotive industry for alternator systems, is to purchase forward and reverse poled semiconductor rectifier diodes and assemble the diodes into the desired bridge assembly. As used throughout this specification, forward poled rectifier diodes refers to those rectifiers that have their cathodes electrically connected to the mounting stud and reverse poled rectifier diodes refers to those rectifiers that have their anodes electrically connected to the mounting stud.

Extreme care must be taken in the assembly operation to insure that the forward and reverse poled rectifiers, which are similar in physical configuration, are not intermixed. In constructing single phase or multi-phase bridge assemblies, a plurality of forward poled rectifiers are disposed in thermal and electrical communication with a mounting member. The mounting member serves as a heat sink to remove heat rapidly from the forward poled rectifiers and also serves as an electrical bus for the positive polarity of the unidirectional potential produced by the rectifier bridge assembly.

In like manner, a plurality of reverse poled rectifiers are disposed in thermal and electrical communication with another mounting member, which is similar to the mounting member containing the forward poled rectifiers and serves as an electrical bus for the negative polarity of the unidirectional potential produced by the rectifier bridge assembly.

The forward and reverse poled rectifiers are attached to the mounting members by soldering, brazing, pressure contact, screw threads, or any other suitable means. If the rectifiers are soldered to the mounting member, a holding and locating fixture is usually required to hold the rectifiers, solder pre-form members, and mounting member in the proper physical relationship during the heating operation.

When the assemblies of forward poled rectifiers and the assemblies of reverse poled rectifiers are completed, they are usually electrically tested. Then, one assembly of forward poled cells is disposed in close mechanical relationship with an assembly of reverse poled cells, with the respective mounting members being mechanically connected together but electrically insulated from each other. The flexible leads or conductors of the forward poled rectifiers are then each electrically connected to a flexible lead of one of the reverse poled rectifiers. The alternating potential conductors from the alternating potential source to be rectified, are connected to the junctions of the flexible leads from the forward and reverse poled rectifiers, and the unidirectional load is connected to the mounting members. The completed rectifier bridge assembly is then electrically tested.

It would be desirable to eliminate the necessity of using individual forward poled rectifiers and individual reverse poled rectifiers, and thus eliminate the intermixing problem on the assembly line during the manufacture of the bridge rectifier assemblies. Further, it would be desirable to form the rectifier bridge assembly in one operation, eliminating the intermediate testing operations and the elimination of the manufacturing steps required to first form two sub-assemblies and then form the final assembly. In instances where the rectifiers are to be fastened to the mounting member or heat sink by soldering or brazing it would be desirable to eliminate the expensive fixtures required to hold the rectifiers, solder preform wafers and mounting member in the proper physical relationship, plus the time required to assemble the various components into the fixture and remove the completed assembly from the fixture after the heating operation. It would also be desirable to reduce the number of rectifier components required to construct the various bridge assemblies. Further, it would be desirable to reduce the manufacturing cost of the bridge rectifier assemblies and at the same time increase the expected useful life and the electrical rating of the bridge rectifier assembly. This may be accomplished by the elimination of the requirement of the flexible lead on the semiconductor rectifiers used in the bridge rectifier assemblies and the replacement of the flexible lead with a large contact surface which aids in the removal of heat from the semiconductor junction or element, thus allowing rectifier bridge assemblies to have higher power ratings without increasing the size of the expensive semiconductor rectifier element, or greatly increasing the expected life of the rectifier assembly. The short time overload capacity of the bridge rectifier assembly would also be greatly improved.

Accordingly, it is an object of this invention to provide new and improved rectifier apparatus.

Another object of the invention is to provide new and improved rectifier bridge assemblies which may be assembled in one operation.

Another object of the invention is to provide new and improved rectifier bridge assemblies which are held in assembled relationship without the requirement of external fixtures.

A further object of this invention is to provide new and improved rectifier apparatus which may be assembled by using a reduced number of mechanically and electrically similar rectifier components.

Still another object of this invention is to provide new and improved rectifier bridge assemblies which utilize semiconductor rectifiers with two large contact surfaces which improve the heat removal rate from the semiconductor rectifier junction.

Briefly, the present invention accomplishes the above cited objects by utilizing the type of rectifier construction whereby two rectifying semiconductor junctions are connected in series circuit relation, and a conductor is connected between the two series connected semiconductor junctions. This type of rectifier construction, which will be referred to in the specification as a "rectifier doubler," has the two semiconductor junctions disposed relative to each other such that the negative or N region of one semiconductor junction is electrically connected to the positive of P region of the other semiconductor junction. By disposing the proper number of rectifier doublers, determined by the number of electrical phases in the alternating potential source, between two thermally and electrically conductive members, a bridge rectifier may be created, with the alternating potential source being connected to the conductors emanating from the rectifier doublers and the unidirectional load being connected to the two thermally and electrically conductive members. The rectifier doublers may be fastened to the two members by soldering, pressure contact or any other suitable means. Thus, a complete bridge rectifier is assembled in one operation by using a reduced number of mechanically and electrically similar rectifier components. Further, the "button" type rectifiers or rectifier doublers do not require a flexible lead on the rectifier devices with the resultant increase in heat sink surface that may be placed in contact with the semiconductor rectifier element.

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings, in which.

Figure 1:
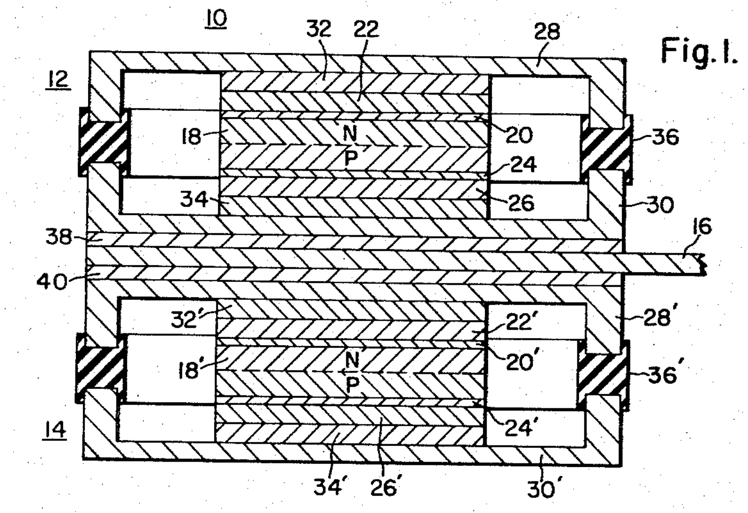
FIGURE 1 is an enlarged, front elevation, in cross-section of a semiconductor device.
Figure 2:
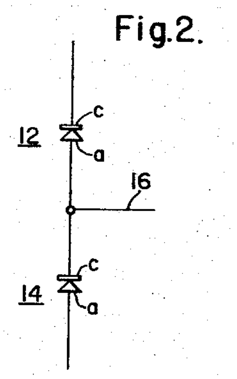
FIG. 2 shows the schematic equivalent of the semiconductor device shown in FIG. 1.

Referring now to the drawings, and FIG. 1 in particular, there is shown a front elevation, in cross-section, illustrating a typical construction of a semiconductor device which may be used in this invention. More specifically, the bridge rectifier assemblies to be described hereinafter, utilize a semiconductor device which is a double rectifier or rectifier doubler, which comprises a first and second semiconductor junction connected in series circuit relation. The semiconductor device 10 shown in FIG. 1, comprises a first rectifier section 12, a second rectifier section 14 and lead or conductor 16. The first and second rectifier sections 12 and 14, are disposed relative to the conductor 16 and to one another, as shown with graphical symbols in FIG. 2, with each of said rectifier sections having an anode electrode *a* and a cathode electrode *c*. Rectifier section 12 has its positive portion, or anode *a*, connected to conductor 16 and to the negative portion, or cathode *c* of rectifier section 14.

More specifically, rectifier section 12, shown in FIG. 1, is comprised of a semiconductor element 18, which may comprise N-silicon, P-silicon, N-germanium, P-germanium or suitably doped silicon-germanium alloys thereof, or other semiconductor materials. One side of element 18 is joined by a suitable solder 20 to an intermediate contact member 22, which may comprise any suitable metal such as molybdenum, tantalum, tungsten, copper or the like. In like manner, the other side of element 18 is joined by a suitable solder 24 to an intermediate contact member 26. Member 26 is similar to member 22 and may comprise molybdenum, tantalum, tungsten, copper or any other suitable metal.

Depending upon whether the element 18 is N or P type semiconductor, either solder 20 or 24 must be of the type capable of converting the element 12 in contact therewith to the opposite type of semiconductivity, so that the proper N-P relationship may be established. For example, if element 12 is comprised of N-silicon, solder 24 may be an aluminum-silicon solder. The composition of aluminum-silicon solder containing 89% aluminum and 11% silicon has been found to be quite satisfactory. If the element 18 is comprised of P-type silicon, solder 20 may be a gold base solder. Compositions of gold base solder that have been found to be satisfactory are 99% gold and 1% antimony, or 94% gold, 5% lead and 1% arsenic. If the element 18 is N-germanium, satisfactory solders which may be used for solder 24 comprise 100% indium, or 100% aluminum, or 49% indium, 45% gold, 5% germanium and 1% aluminum. If element 18 is P-germanium, a satisfactory solder which may be used for solder 20 is a lead base solder comprising 90% lead and 10% antimony or 99% lead and 1% arsenic.

The solder 20 or 24 not required to be of the type which will change the portion of the element 12 in contact therewith to the opposite type of semiconductivity, may comprise any silver, gold, tin, aluminum or the like ohmic solder capable of joining member 18 to member 22, or member 26. This solder may be either a soft solder or a brazing alloy. A silver-lead-antimony solder comprising 97% silver, 2% lead and 1% antimony has been found to be satisfactory when the element 18 is N-silicon. A tin base solder comprising 60% tin, 39% lead and 1% antimony may also be used for N-germanium or N-silicon. A pure aluminum or pure indium solder will be satisfactory when the element 18 is P-germanium.

To complete rectifier section 12, members 22 and 26 are joined to casing members 28 and 30 with suitable solders 32 and 34, respectively. The casing members 28 and 30 are joined by electrical insulating material 36, such as ceramic or epoxies, to form a hermetically sealed enclosure. Electrical insulating material 36 prevents shorting element 18 through the casing members 28 and 30.

Thus, in forming rectifier section 12, it is not necessary to provide a flexible lead, which simplifies the assembly of the rectifier device and substantially increases the amount of heat sink surface in contact with the semiconductor element 18. Both sides of the element 18 have excellent means for disposing of the heat generated in the element 18, with one side being connected to casing member 30 and the other side being connected to casing member 28. Therefore, with the increased heat removal rate, it is possible to design a bridge rectifier having an increased electrical rating without increasing the size of the semiconductor rectifier junction, or using the same size semiconductor rectifier junction and electrical rating, the life of the bridge assembly could be substantially increased, as well as increasing the short time overload capability of the device without damage to the semiconductor junction, or, a certain electrical rating of the bridge rectifier may be obtained with a smaller semiconductor rectifier junction than in the prior art method of constructing rectifier bridge assemblies, thus reducing the cost of the bridge rectifier assembly.

Rectifier section 14 may be formed with similar materials and in a manner similar to the rectifier section 12, with like reference numerals indicating like components, except a prime mark has been added to the reference numerals in rectifier section 14.

To complete the rectifier assembly 10, rectifier sections 12 and 14 are joined with a suitable solder, 38 and 40 to conductor 16, such that the P-side of element 18 is towards conductor 16 and the N-side of element 18' is towards conductor 16. Conductor 16 may be a fairly heavy metallic strap, such as copper or aluminum, to facilitate heat removal from casing members 38 and 28' as well as being an electrical conductor. The various components of the semiconductor device 10 may be assembled in one operation, or rectifier sections 12 and 14 may be individually formed and then both joined to conductor 16.

Figure 3:
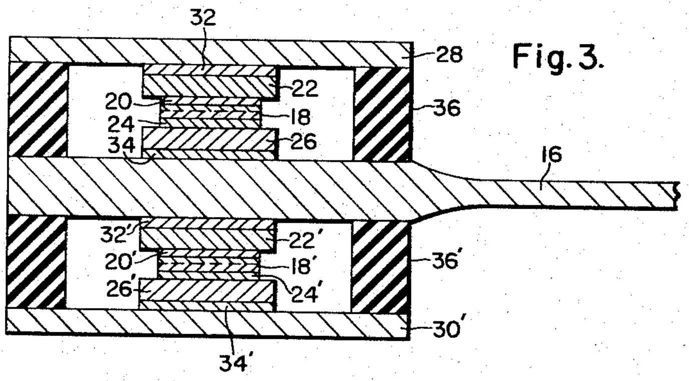
FIG. 3 is an enlarged front elevation, in cross-section of a semiconductor device.

While the construction of the rectifier doubler assembly shown in FIG. 1 is typical, it is possible to make many modifications thereto, and the invention is not to be limited to any particular design. For example, intermediate contact members 22 and 26 may be eliminated, with the semiconductor element 18 being joined directly to casing members 28 and 30 with a suitable solder, such as 95% lead and 5% tin, or 92% lead, 5% indium and 3% silver. Further, it is possible to use a semiconductor element 18 which has already had the necessary impurities diffused into it, resulting in a semiconductor structure with layers such as $P^+NN^+$, PIN, $P^+PN^+$, or PN. If the semiconductor element 18 is silicon, metals such as nickel, gold, or silver may be deposited, by plating, evaporation, or any other suitable means, on the surface of the semiconductor element 18, thus allowing solder layers 20 and 24 to be of the same composition without regard to the fact that they contact silicon by different conductivity types. For example, when semiconductor element 18 has already had the necessary impurities diffused into it, solder layers 20 and 24 may both be of the same material, such as 92.5% lead, 5% indium and 2.5% silver. Another modification which would simplify the construction of the rectifier doubler would be to form the casing members 30 and 28' and conductor 16 from one piece of material, thus eliminating solder layers 38 and 40. FIG. 3 illustrates this embodiment, with like reference numerals in FIGS. 1 and 2 indicating like components.

Figure 4:
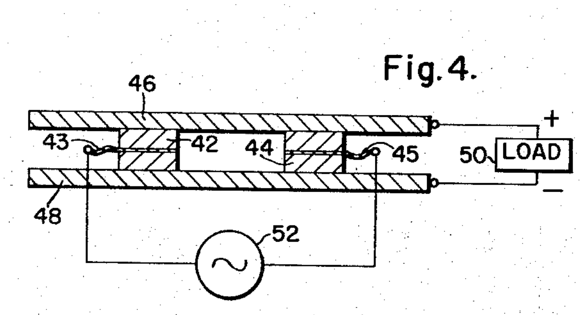
FIG. 4 is a front elevation, in cross-section, illustrating an embodiment of the invention.
Figure 5:
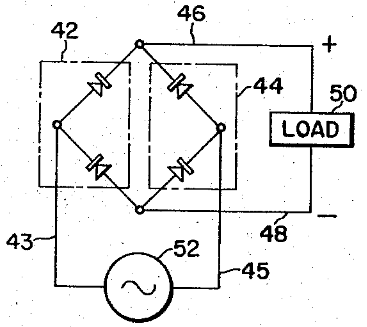
FIG. 5 shows a schematic diagram illustrating the embodiment of the invention shown in FIG. 4.

One embodiment of the invention is shown in FIGS. 4 and 5, with FIG. 4 showing a front elevation, in cross section, of a single-phase, full-wave bridge assembly and FIG. 5 showing the bridge structure of FIG. 4 schematically.

More specifically, a single-phase, full-wave integral bridge rectifier assembly may be formed using rectifier doublers 42 and 44, having conductors 43 and 45, respectively, and two thermally and electrically conductive heat sink members 46 and 48. The rectifier doublers 42 and 44 may be suitably joined to members 46 and 48, by soldering, brazing, pressure fit, or any other suitable means, with both of said rectifier doublers being oriented in the same direction. In other words, both rectifier doublers should be disposed relative to each other such that their negative portions are both in contact with the same thermally and electrically conductive member 46 or 48, and their positive portions both in contact with the other of said thermally and electrically conductive members. If both rectifier doublers 42 and 44 have their negative portions joined to conductor 46, member 46 will be positive and member 48 will be negative as indicated in FIG. 4, and may be connected to a unidirectional load 50. The conductors 43 and 45 attached to rectifier doublers 42 and 44, respectively, are connected to a single phase alternating potential source 52.

FIG. 5 shows the schematic diagram of the assembly shown in FIG. 4, with like reference numerals referring to like components. The rectifier doublers 42 and 44 are shown inside the dotted enclosures in FIG. 5.

The assembly shown in FIG. 4 greatly simplifies the manufacture of single-phase, full-wave bridge rectifier assemblies. The rectifier doublers 42 and 44 are merely disposed between thermally and electrically conductive heat sink members 46 and 48, such as copper or aluminum and the rectifier bridge assembly is complete. Heat sink members 46 and 48 may be bus bars of any configuration or shape. The assembly may be performed in one simple step, eliminating the time consuming and expensive plurality of steps required by the prior art methods, as well as the elimination of intermediate tests that are usually performed after each intermediate step in the prior art. After one assembly operation, the rectifier bridge assembly shown in FIG. 4 is complete and ready for test if the rectifier doublers 42 and 44 are secured to members 46 and 48 by pressure contact, and is complete and ready for a heating operation, if the rectifier doublers 42 and 44 are to be secured to members 46 and 48 by brazing or soldering. Further, the rectifier bridge assembly produced by the method and principles of this invention will produce a rectifier assembly having a longer life, or increased electrical rating, or both.

Figure 6:
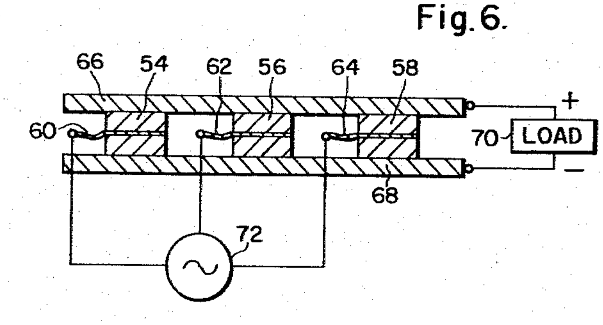
FIG. 6 is a front elevation, in cross-section, illustrating another embodiment of the invention.
Figure 7:
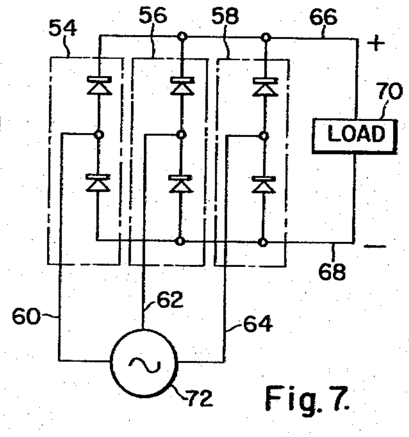
FIG. 7 shows a schematic diagram illustrating the embodiment of the invention shown in FIG. 6.

FIGURES 6 and 7 show another embodiment of the invention, with FIG. 6 showing a front elevation, in cross section, of a three-phase, full-wave bridge assembly, and FIG. 7 showing the bridge structure of FIG. 6 schematically.

More specifically, a three-phase, full-wave, integral bridge rectifier assembly may be formed using rectifier doublers 54, 56 and 58, having conductors 60, 62 and 64, respectively, and thermally and electrically conductive members 66 and 68. The rectifier doublers 54, 56 and 58 may be joined to members 66 and 68 by soldering, brazing, pressure contact, or any other suitable means, with all of said rectifier doublers being oriented in the same direction so that all the negative portions of the rectifier doublers 54, 56 and 58 contact one of said thermally and electrically conductive members, 66 or 68, and the positive portion of the rectifier doublers being in contact with the other of said thermally and electrically conductive members. If the rectifier doublers 54, 56 and 58 are oriented so that their negative portions are joined to member 66, member 66 will be positive and member 68 will be negative, as indicated in FIG. 6. Thus, the members 66 and 68 may be connected directly to a unidirectional load 70. The conductors 60, 62 and 64 attached to rectifier doublers 54, 56 and 58, respectively, are connected to a three-phase, alternating potential source 72.

FIG. 7 shows the schematic diagram of the bridge assembly shown in FIG. 6, with like reference numerals referring to like components. The rectifier doublers 54, 56 and 58 are shown inside the dotted enclosures in FIG. 7.

Thus, changing from a single-phase, full-wave bridge assembly to a three-phase, full-wave bridge assembly requires only the addition of a third rectifier doubler. Otherwise, the constructions are similar. The bridge construction shown in FIG. 6 may also be made in one step, eliminating the plurality of intermediate steps required by the prior art methods, and eliminating intermediate testing.

Figure 8:
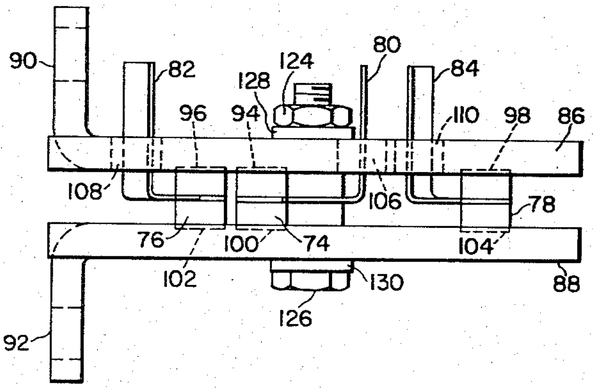
FIG. 8 is a front elevation of a bridge rectifier assembly constructed in accordance with the principles of this invention.
Figure 9:
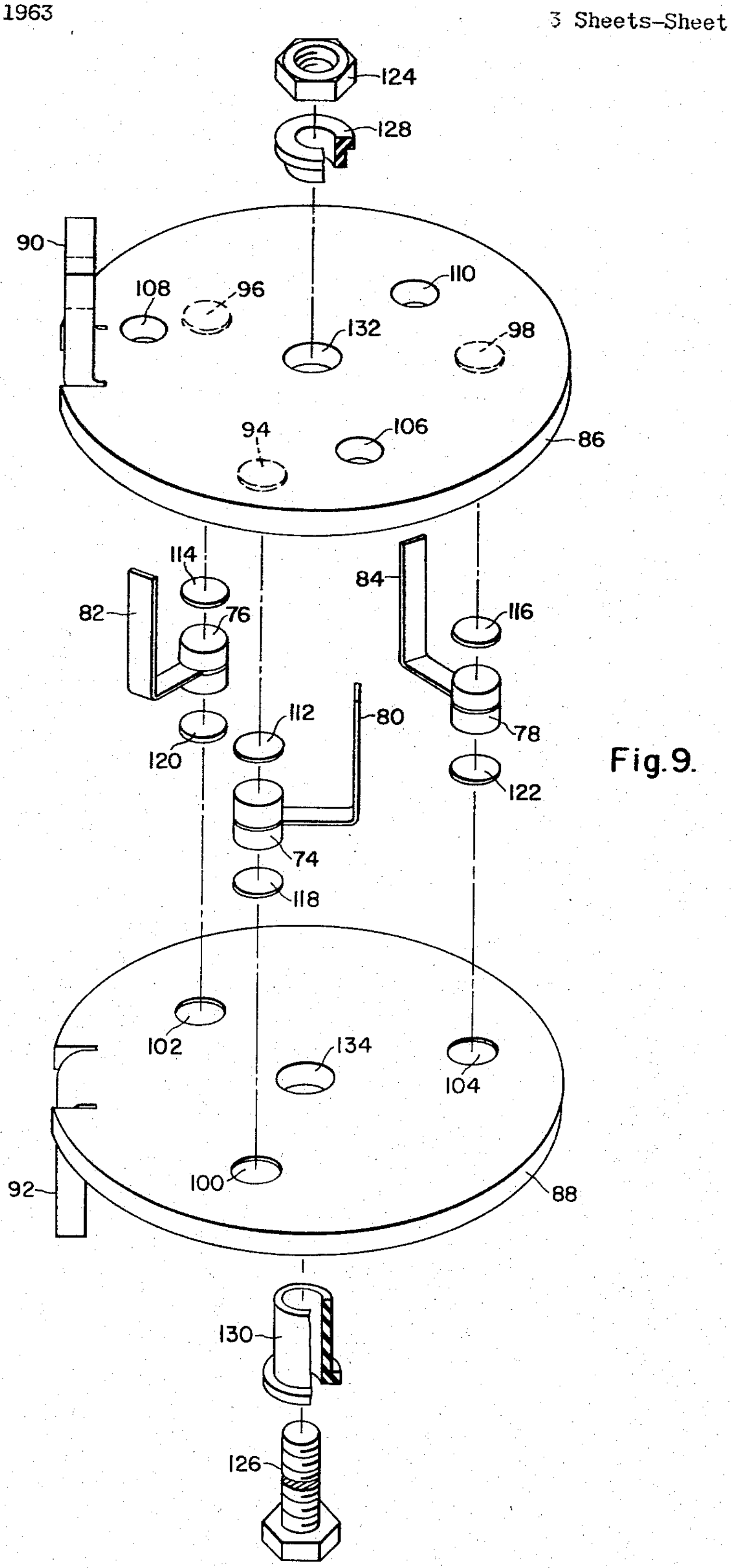
FIG. 9 is an exploded perspective view of the bridge rectifier shown in FIG. 8.

A practical embodiment of a three-phase, full-wave bridge rectifier assembly is shown in FIGS. 8 and 9. The bridge assembly shown in FIGS. 8 and 9 is suitable for use with the automotive type of alternator, which generates an alternating potential which is then rectified for battery charging purposes and other electrical loads in the vehicle. FIG. 8 shows a front elevation of a three-phase, full-wave bridge rectifier assembly and FIG. 9 shows the bridge rectifier assembly of FIG. 8 in an exploded view.

The bridge assembly shown in FIGS. 8 and 9 is a three-phase, full-wave bridge rectifier and utilizes rectifier doublers 74, 76 and 78 having conductors 80, 82 and 84, respectively. Rectifier doublers 74, 76 and 78 are disposed between two thermally and electrically conductive members 86 and 88. Members 86 and 88 may be copper, aluminum, or any other suitable conductor of heat and electricity. Since members 86 and 88 form the positive and negative connections to the bridge rectifier assembly, projections 90 and 92 may be formed on members 86 and 88, respectively, for connection to the unidirectional load.

In the particular embodiment shown in FIGS. 8 and 9, the rectifier doublers 74, 76 and 78 are secured to members 86 and 88 by soldering. However, as hereinbefore stated, pressure contact, or any other suitable means may be used. In order to provide locating points and a depression to contain the solder, the depressions 94, 96 and 98 may be formed in member 86, and depressions 100, 102 and 104 may be formed in member 88.

In order to facilitate the making of connections from the rectifier doublers to an alternating potential source from conductors 80, 82 and 84, openings 106, 108 and 110 may be formed in member 86 which will allow conductors 80, 82 and 84 to extend through member 86 without danger of coming into contact with said member. As hereinbefore stated, rectifier doublers 74, 76 and 78 are soldered to members 86 and 88, with suitable discs or wafers of preformed solder 112, 114 and 116 being disposed between rectifier doublers 74, 76 and 78 and member 86, and discs or preforms of solder 118, 120 and 122 being disposed between rectifier doublers 74, 76 and 78 and member 88.

In order to hold the bridge rectifier assembly shown in FIGS. 8 and 9 in assembled relationship and also hold the assembly together mechanically to prevent any mechanical strains from being imposed upon the rectifier doublers 74, 76 and 78, a suitable fastening means may be used such as a nut 124 and a bolt 126. The nut and bolt 124 and 126, respectively, must be insulated from the members 86 and 88 to prevent an electrical short circuit between said members. Suitable insulating means, such as insulating members 128 and 130 may be used. Suitable openings 132 and 134 may be formed in members 86 and 88, to receive the bolt 126 and insulating members 128 and 130. The various openings and depressions may be formed in members 86 and 88 in the same operation that forms said members.

In the assembly of the three-phase, full-wave bridge rectifier shown in FIGS. 8 and 9, bolt 126 and insulating member 130 could be located in opening 134 of member 88 and then solder discs 118, 120 and 122 could be disposed in depressions 100, 102 and 104 of said member. Rectifier doublers 74, 76 and 78, with pre-bent conductors 80, 82 and 84 could then be disposed on solder discs 118, 120 and 122, respectively, with the conductors 80, 82 and 84 being oriented circumferentially in a predetermined manner. Solder preforms 112, 114 and 116 could next be disposed upon rectifier doublers 74, 76 and 78. Member 86 could then be oriented to allow conductors 80, 82 and 84 to extend through openings 106, 108 and 110 and bolt 126 to extend through opening 132, and then lowered to allow the depressions 94, 96 and 98 to rest upon the solder preforms 112, 114 and 116. Insulating member 128 could be placed over the protruding threaded portion of bolt 126 such that said insulating members enters opening 132. The assembly is complete and ready for the heating operation by disposing nut 124 upon bolt 126 and tightening said nut and bolt such that nut 124 is snugly secured against insulating means 128 and bolt 126 is snugly secured against insulating means 130.

It will be noted that before melting the solder preforms, the rectifier bridge assembly has all of its components held in the proper physical relationship, without the aid of external fixturing. Thus, the assembly may have the heating operation performed for melting the solder preforms, by induction heating, oven, or furnace, or any other suitable heating means, without the necessity of expensive holding and locating fixtures.

Figure 10:
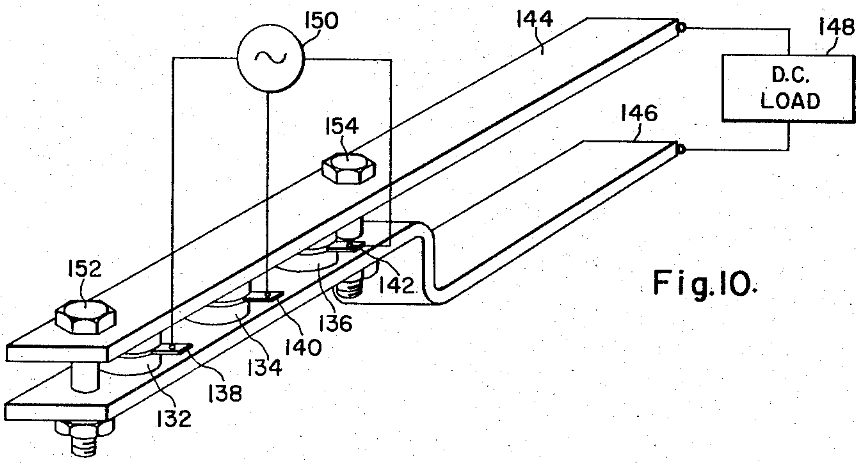
FIG. 10 is a perspective view of another bridge assembly constructed according to the teachings of this invention.

FIG. 10 shows an embodiment of the invention which would be exceedingly inexpensive to manufacture. In this embodiment, the rectifier devices are disposed between the bus bars that supply the direct current load. More specifically, rectifier doublers 132, 134 and 136 having conductors 138, 140 and 142, respectively, are disposed between bus bars 144 and 146 by pressure fit, soldering, brazing or any other suitable fastening means. In the particular embodiment shown in FIG. 10, three rectifier doublers are shown, for use with a three-phase alternating potential source. If the alternating potential source were single phase, it would only be necessary to remove one of the rectifier doublers.

The bus bars 144 and 146 are connected to the direct current load 148, and an alternating potential source 150 is connected to the conductors 138, 140 and 142 of the rectifier doublers 132, 134 and 136.

Suitable clamping means 152 and 154, such as a nut and bolt may be used to hold the bus bars 144 and 146 in mechanical alignment without placing mechanical strain on the rectifier doublers 132, 134 and 136. The clamping means 152 and 154 should be suitably insulated from the bus bars 144 and 146 to prevent shorting said bus bars.

The rectifier bridge assemblies disclosed herein have many advantages, in addition to the hereinbefore mentioned fact that the assembly does not have to be fixtured during the heating operation for soldering or brazing, if the assembly is of the type where the rectifiers are to be attached to the heat sinks in this manner. Other advantages are the elimination of a plurality of manufacturing steps required by the prior art, which involves the manufacture of sub-assemblies, with the sub-assemblies being tested before the final assembly. Further, all of the rectifier devices are similar, making it unnecessary to stock and keep separate two different rectifier types, thus eliminating the possibility of intermixing rectifier types during the assembly operation. Still further, fewer components are required to form any given bridge rectifier assembly, making the assembly of a bridge rectifier faster and more simple. Also, the bridge rectifier assembly is improved from the standpoint of the elimination of the flexible leads on the rectifier devices and the replacement of the flexible lead with a large contact surface which facilitates heat removal from the semiconductor element, providing a bridge rectifier with increased life and higher electrical rating.

It will, therefore, be apparent that there has been disclosed new and improved rectifier bridge apparatus that may be assembled in one operation, with a minimum number of mechanical and electrical components, and which is held in assembled relationship without the aid of external fixturing.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense. For example, the invention is not to be limited to the single phase and three phase bridge construction described, as the intent and scope of the invention applies to bridge rectifier constructions of single or multi-phase design.

We claim as our invention:

A three-phase rectifier bridge assembly comprising:

first and second electrically conductive heat sink members each having a terminal thereon adapted for connection to a direct current circuit, first means mechanically securing said first and second heat sink members in predetermined spaced, insulated relation, one of said first and second heat sink members having at least first, second and third openings therein, first, second and third rectifier doubler assemblies each having first and second electrical contacts at opposite ends thereof and an electrical lead, each rectifier doubler assembly having first and second semiconductor rectifier junctions each having an anode and cathode electrode, the anode electrode of one of said rectifier junctions and the cathode electrode of the other of said rectifier junctions being connected to said electrical lead, the remaining cathode and anode electrodes of said first and second rectifier junctions being connected to said first and second electrical contacts, respectively, the electrical lead of each of said rectifier doubler assemblies extending outwardly therefrom for a predetermined distance and being bent at substantially a right angle in a predetermined direction relative to the orientation of said first and second rectifier junctions, said first, second and third rectifier doubler assemblies being disposed between said spaced first and second heat sink members, with the electrical contact of each of said first, second and third rectifier doubler assemblies being electrically connected to one of said first and second heat sink members, and the second electrical contact of each of said first, second and third rectifier doubler assemblies being electrically connected to the remaining of said heat sink members, said rectifier doubler assemblies being oriented with respect to said first and second heat sink members such that their electrical leads extend through the first, second and third openings of said one heat sink member, respectively, said electrical leads being adapted for connection to an alternating current circuit.

References Cited

UNITED STATES PATENTS

| | | | |
|---|---|---|---|
| 2,501,331 | 3/1950 | Hein | 175—366 |
| 2,721,964 | 10/1955 | Trickey et al. | 317—234 |
| 2,999,940 | 9/1961 | Hoffmann et al. | 250—211 |
| 3,044,168 | 10/1961 | Emeis | 250—211 |
| 3,006,067 | 10/1961 | Anderson et al. | 29—470 |
| 3,030,557 | 4/1962 | Dermit | 317—234 |
| 3,056,100 | 9/1962 | Warner | 338—25 |
| 3,110,080 | 11/1963 | Boyer et al. | 29—25.3 |
| 3,141,226 | 6/1964 | Bender et al. | 29—25.3 |
| 3,159,780 | 12/1964 | Parks | 317—234 XR |
| 3,183,407 | 5/1965 | Yasuda et al. | 317—101 |

JOHN W. HUCKERT, *Primary Examiner.*

R. SANDLER, *Assistant Examiner.*